Oct. 26, 1954　　T. A. WETZEL ET AL　　2,692,527
OPTICAL ALIGNING APPARATUS FOR MACHINE TOOLS
Filed March 8, 1950　　　　　　　　　　　　　　　　5 Sheets-Sheet 1

INVENTORS
Elroy J. Wutschel
Theodore A. Wetzel
BY
Elroy J Wutschel
Attorney

Oct. 26, 1954

T. A. WETZEL ET AL 2,692,527

OPTICAL ALIGNING APPARATUS FOR MACHINE TOOLS

Filed March 8, 1950

INVENTORS
Elroy J. Wutschel
Theodore A. Wetzel
BY
Elroy J Wutschel
Attorney

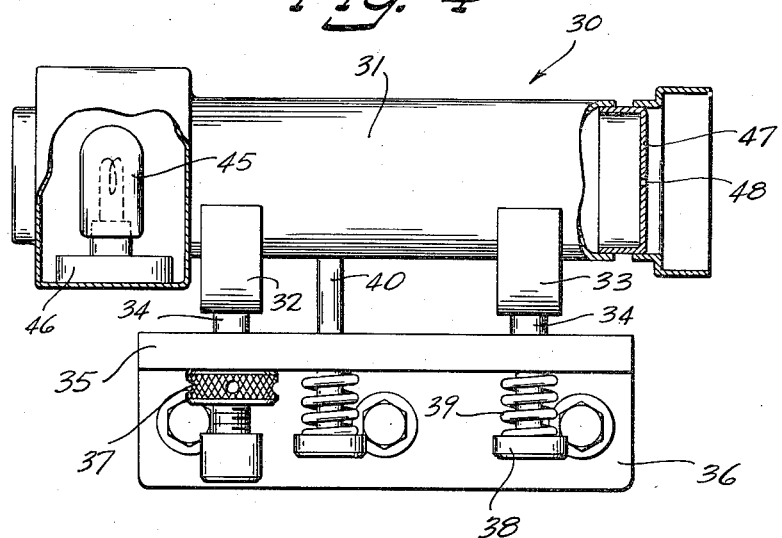
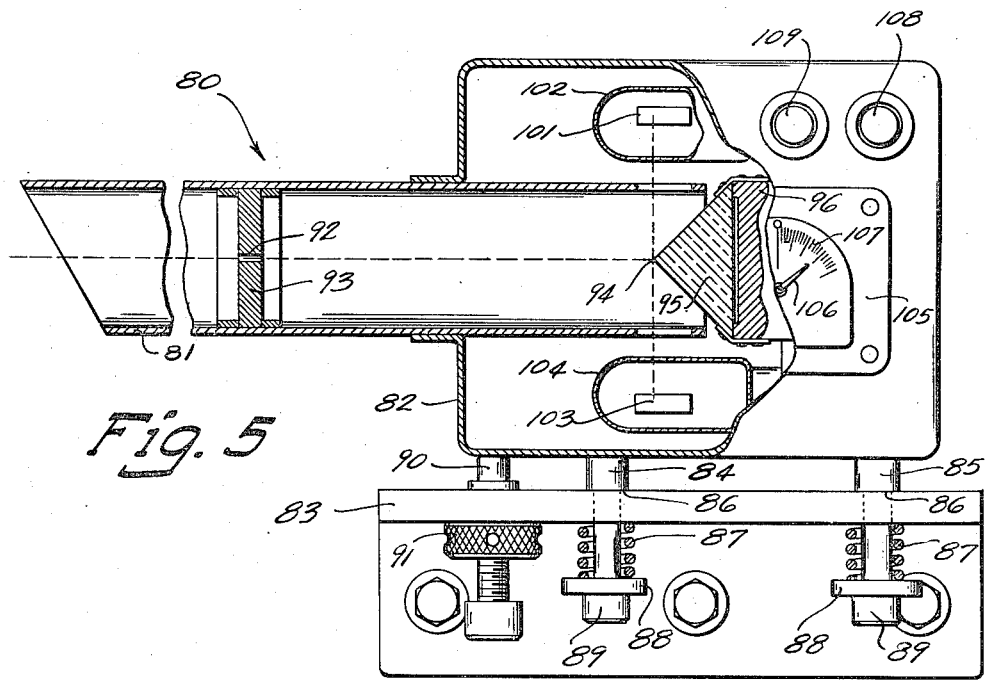

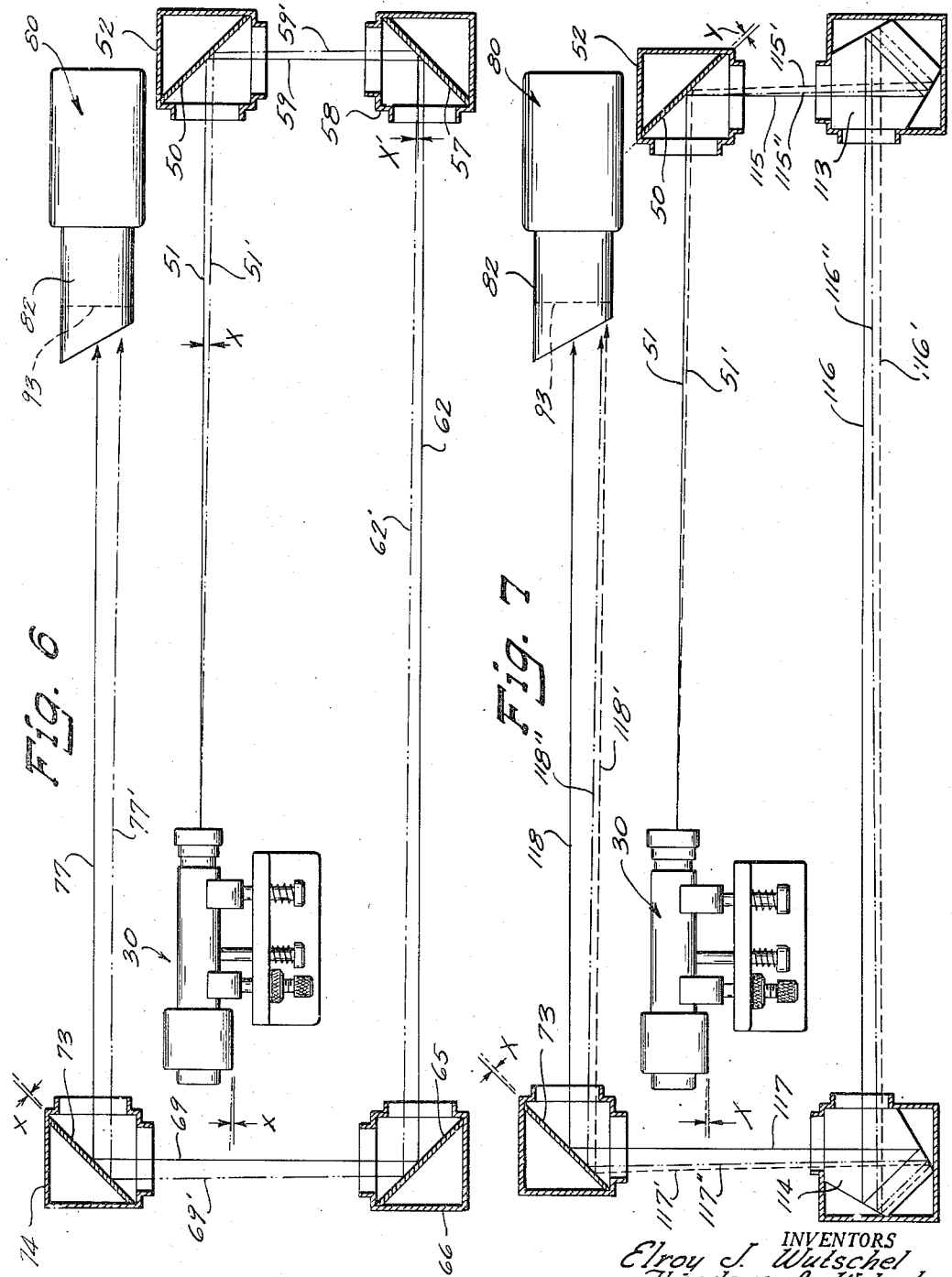

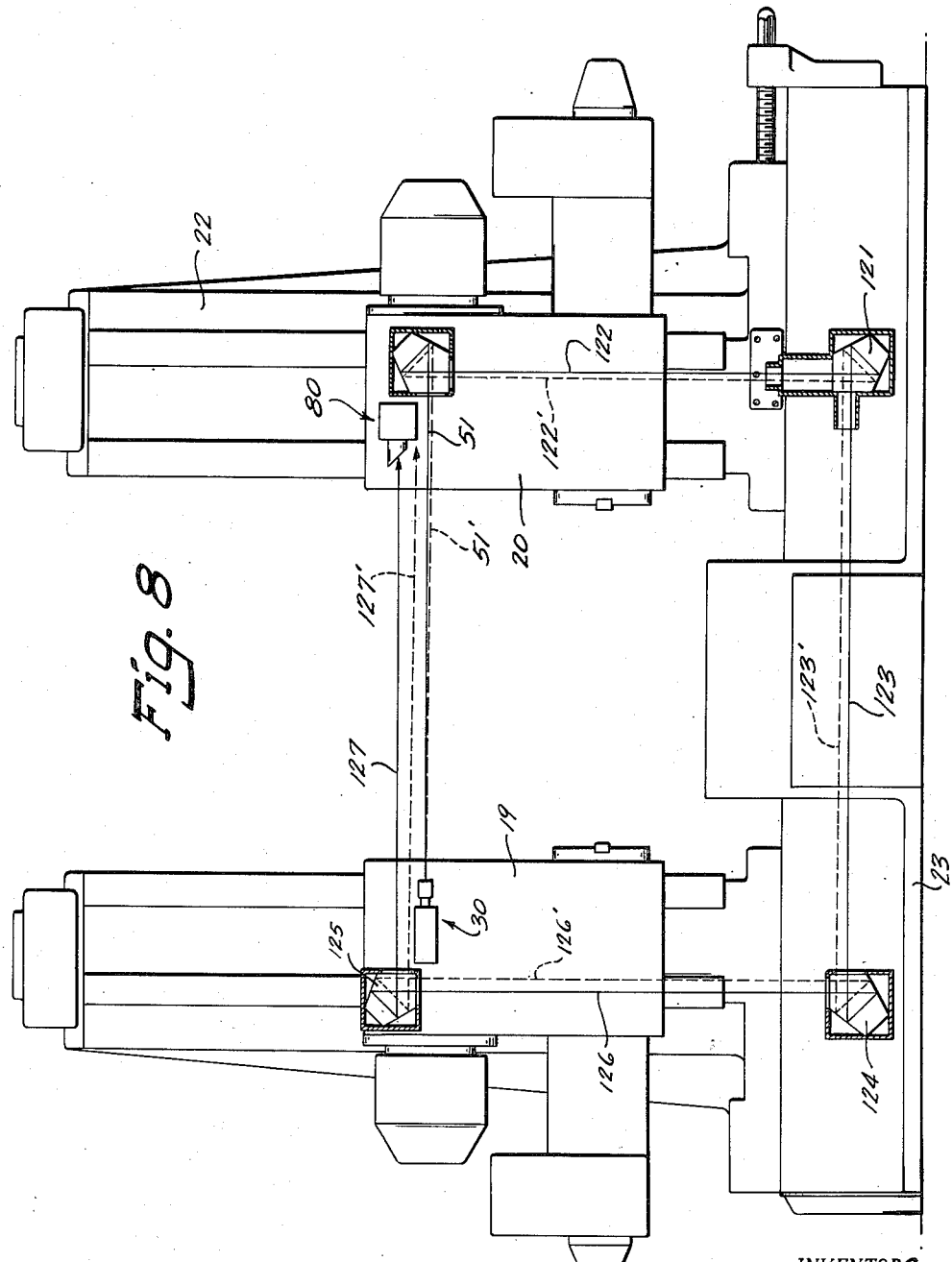

Patented Oct. 26, 1954

2,692,527

UNITED STATES PATENT OFFICE 2,692,527

OPTICAL ALIGNING APPARATUS FOR MACHINE TOOLS

Theodore A. Wetzel and Elroy J. Wutschel, Milwaukee, Wis., assignors to Kearney & Trecker Corporation, West Allis, Wis., a corporation of Wisconsin Application March 8, 1950, Serial No. 148,434

11 Claims. (Cl. 88—14)

This invention relates generally to means for effecting the alignment of relatively movable elements and more particularly to an improved apparatus for aligning machine tool elements and the like.

A general object of the invention is to provide an improved means for determining the relative position of several movable objects.

Another object of the invention is to provide an aligning apparatus for indicating the relative misalignment between a pair of movable machine tool elements, or the misalignment of one machine element on the column or base.

Still another object of the invention is to provide an optical alignment apparatus in which a plurality of reflecting prisms serve to multiply the error of misalignment.

Another object of the invention is to provide an improved optical alignment apparatus in which a pre-formed light beam of uniform intensity is successively reflected by means of a series of reflective prisms in a parallelogrammatic pattern with any deviation in said pattern serving to indicate a degree of misalignment.

Another object of the invention is to provide an improved optical alignment instrument for a machine tool in which a light beam of uniform intensity and relatively narrow cross-section in a plane transverse and parallel to the plane of machine tool member movement is successively reflected by means of a plurality of reflective prisms in a predetermined pattern.

According to this invention, an alignment apparatus is provided for effecting alignment between two relatively movable elements of a machine tool. The alignment apparatus consists of a light beam projecting means mounted on one of the movable elements and an electronically sensitive target means mounted on the other movable element. The light beam from the projecting means is pre-formed to provide a comparatively narrow ribbon-like light beam which is directed toward a total reflection prism fixedly mounted on the other movable element. The prism is of the reflective type which serves to direct the light beam toward a second prism fixedly mounted on the base of the machine tool. This prism, in turn, reflects the light beam toward a third prism fixedly mounted on the base of the machine; both of the prisms on the base of the machine are in vertical alignment with the prisms mounted on the movable elements and are in alignment horizontally with each other. The light beam projected to the third prism is reflected therefrom toward a fourth prism fixedly mounted on the side of the first mentioned movable element. From this prism, the light beam is projected toward the target means carried on the other movable element. Since all of the prisms are of the reflective and/or the constant light angle type, a rectangular or parallelogrammatic light beam pattern is created. When each of the two movable elements are in operative alignment on the columns, and when each of them are in axial alignment with each other, the light beam path will be uninterrupted and the full intensity of the beam will be received by the target means. The target means is of the electronically sensitive type which serves to indicate any deviation of the light beam above or below a predetermined point of perfect alignment. Thus, the light beam projected on the target will readily indicate the degree of misalignment between the movable elements and/or misalignment of either movable element on the machine. The target device may be used to operate a visual or audial signaling means and thus indicate when the two movable elements are in absolute alignment. The alignment means is mounted on each of the movable elements and on the base of the machine tool in a manner to multiply the degree of error as the light beam is reflected in the aforedescribed pattern. In this manner, the degree of preciseness of the alignment means is likewise multiplied and any misalignment of either of the elements, or misalignment between the elements, serves to distort the light beam pattern whereby the position of the light beam striking the target means is varied accordingly. Several modifications of the invention incorporating a constant angle type of prism serve to provide a slight variation in the light beam patterns and to change the sensitivity of the apparatus.

The foregoing and other objects and advantages of the invention will become more fully apparent from the following detailed description of the exemplifying embodying apparatus shown in the accompanying drawings, in which:

Fig. 4 is an enlarged view of the projector instrument and its supporting base adapted to adjustably support the instrument on the movable tool element;

Fig. 5 is a view in vertical section shownig the target and alignment indicating instrument operatively mounted on the machine tool;

Fig. 6 is a diagrammatic showing of the alignment apparatus showing various conditions of misalignment;

Fig. 7 is a diagrammatic showing similar to Fig. 6 but utilizing a pair of constant angle prisms to afford a modified version of the invention; and, Fig. 8 is a diagrammatic showing of a second modified version of the invention wherein four constant angle prisms are used to create the light beam pattern.

This invention is clearly illustrated through its application to a boring and milling machine of the double opposed-spindle type as shown in the accompanying drawings. The invention utilizes an optical and photoelectric relay system to precisely check the alignment of a plurality of adjustable movable machine tool elements.

Figure 1:
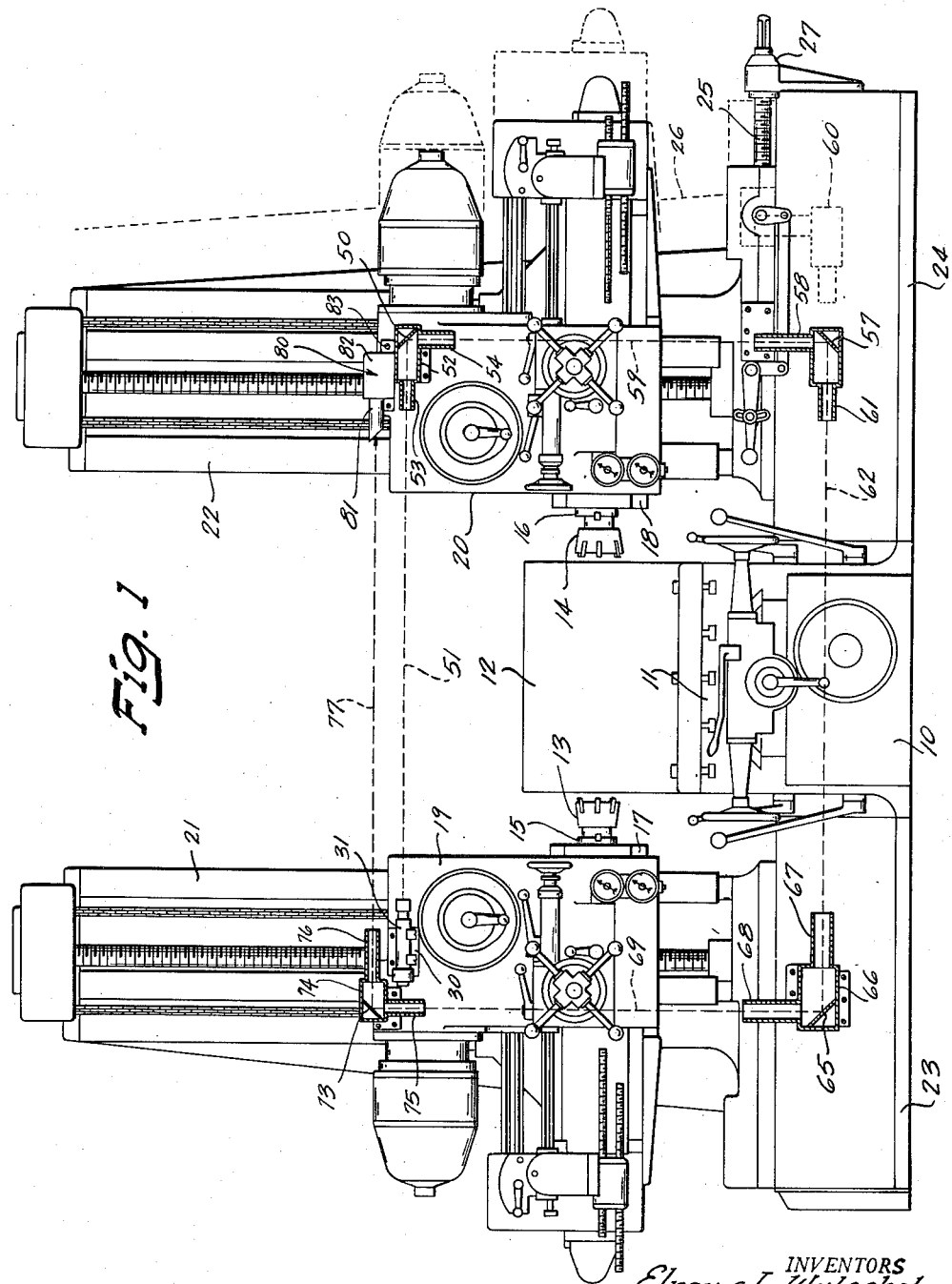
Figure 1 is a front elevation of a combined boring and milling machine provided with an alignment means mounted on a pair of movable tool supporting elements on the machine and reflective prisms operatively disposed to transmit a light beam in a predetermined pattern and embodying the present invention.

As shown generally in Fig. 1 of the accompanying drawings, the boring and milling machine comprises essentially a hollow bed or base 10 serving as the main frame of the machine and supporting a slidable work retaining table 11. The table 11 may be power or manually driven selectively by means of a screw and nut drive mechanism contained within the bed 10 and effect longitudinal reciprocatory movement thereof. A workpiece 12 securely mounted on the table 11 may be readily machined on opposite sides by means of a pair of cutters 13 and 14 operably mounted on tool retaining spindles 15 and 16, respectively. The spindles are power driven to effect rotation of the cutters. Each of the spindles 15 and 16 is mounted in a ram or quill 17 and 18, respectively, which are, in turn, mounted for axial sliding movement toward or from each other in spindle supporting heads 19 and 20, respectively. The spindle heads 19 and 20 are arranged for independent sliding movement on vertical way surfaces formed on the forward face of supporting columns 21 and 22. Thus, the spindle head 19 is disposed for vertical movement on column or upright 21 while the spindle head 20 is disposed for vertical movement on upright or column 22.

The columns 21 and 22 are supported upon bed extensions 23 and 24, respectively. By way of illustration, the column 21 is fixedly mounted on the bed extension 23 while the column 22 is movably mounted on the bed extension 24 with a screw and nut mechanism 25 serving to provide selective positioning thereof in a well known manner. The dotted lines 26 serve to indicate the extreme outer limit of movement of column 22. The bed extensions 23 and 24 are securely bolted to opposite sides of the base 10. Thus, the cutters 13 and 14 may be simultaneously operated in various preselected positions on opposite sides of a workpiece 12 with further adjusting movement in a direction mutually transverse to the vertical and lateral movements provided through the operation of the spindle heads 19 and 20 and the quills 17 and 18. In addition, the column or upright 22 may be independently moved in a direction transversely of the work retaining table 11. The column 22 may be moved laterally through the manipulation of a hand crank (not shown) in a well known manner. A dial 27 on the end of screw shaft 25 serves to precisely indicate the amount of such movement.

In performing machining operations on the boring and milling type of machine tool equipped with the alignment system, as taught by this invention and herein disclosed, it is often desirable to perform multiple operations simultaneously on both sides of a workpiece 11. The alignment system not only serves to permit simultaneous machining operations but also enables coordinated and precise results from such an operation. In order to initiate such an operation, both of the machine tool spindles 15 and 16 must be brought into a predetermined relationship and thereafter maintained within certain limits of accuracy throughout the machining operation.

For example, when performing machining operations simultaneously on opposite sides of the workpiece 12, it is often necessary to bore holes therein with offset center distances, or it may be necessary to bore holes on one side using a single hole on the opposite side as a reference point. In each of these cases, it would be desirable for the person setting up the machining operation to first move the spindles 15 and 16 into direct axial alignment. When thus aligned, a precise reference point would be established and, thereafter, it is merely necessary to adjustably move one or the other of the spindles in a horizontal or vertical plane, or in both planes, as may be required to accomplish a desired milling or boring cut.

The actual alignment of the spindle heads 19 and 20 is accomplished through the use of an aligning apparatus, including optical and electronic means. The system may be adapted to effect alignment of any pair of relatively movable elements. One of the main advantages thereof is the relative ease and preciseness in which alignment is effected. A parallelogrammatic pattern is precisely established through the use of optical prisms and a concentrated light source. Any deviation from the established pattern in the transmission of the light beam is readily indicated by an electronically sensitive target means.

Figure 2:
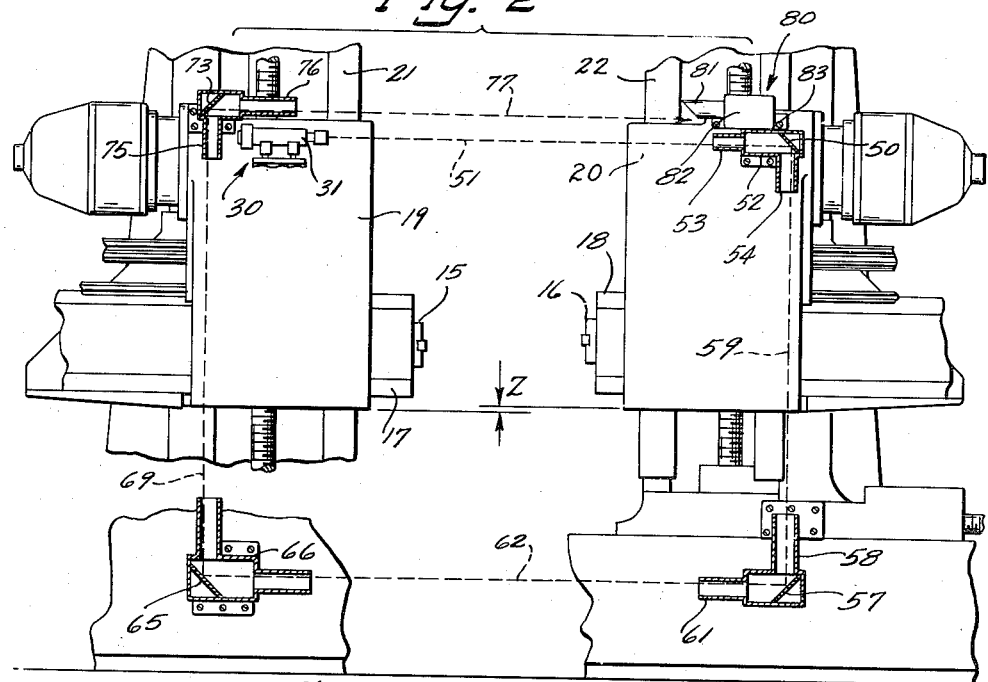
Fig. 2 is a diagrammatic view showing the predetermined light beam pattern existing when the two movable tool elements are in alignment and the light beam pattern existing when the two elements are misaligned relative to each other.
Figure 3:
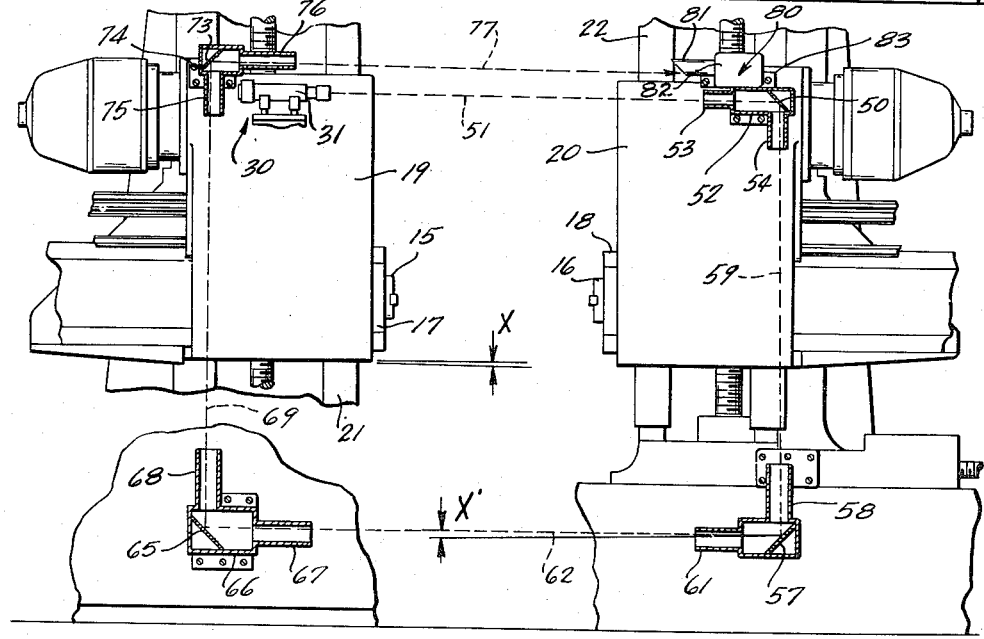
Fig. 3 is a diagrammatic view similar to Fig. 2 wherein the deviation from the true light beam pattern is shown when either of the two movable tool elements is misaligned on the vertical column.

A light beam projector or sender 30 is mounted on the front side of the spindle head 19, as shown in Figs. 1, 2 and 3. The projector is designed to initially project a controlled light beam in a path transverse to the path of movement of the spindle head 19 on the column 21. The projector 30 is comprised essentially of a hollow tubular frame 31 fixedly carried on a pair of supporting yokes 32 and 33. The yokes are each provided with a downwardly extending stud 34 which project through openings in an extending flange 35 on a mounting bracket 36 bolted to the side of the spindle head 19. The lower end of the stud 34 on the yoke 32 is threadedly retained in the bracket flange 35 to provide selective aligning adjustment of the projector 30; a lock nut 37 serves to lock the stud 34 in any desired position after the projector instrument has been precisely aligned. The lower end of the stud 34 on the yoke 33 is provided with a retaining ring 38 which serves as an abutment for a spring 39. Resilient force imparted by the spring 39 serves to cradle the front end of the projector 30. Another downwardly projecting support stud 40 attached to the bottom midsection of the frame 31 is resiliently retained to cradle the other end of the projector 30. With this arrangement, the alignment of the projector 30 may be readily effected to precisely align the light beam projected therefrom.

As shown in Fig. 4, a high-intensity concentrated light source 45 is mounted in a socket 46 carried in the inner end of the frame 31. Adequate ventilation is provided in the end of the casing 31 to prevent overheating. The light ray from the light source 45 is directed axially through the tubular frame 31 against a vertically disposed plate 47 mounted in the forward end of the frame. A horizontal slot 48 centrally disposed in the plate 47 is of extremely narrow width and serves to preform the light beam emitted by the light source 45. The slot 48 is in the range of two thousandths of an inch in width. Thus, the projector will project a light beam of uniform intensity with a comparatively narrow cross section in a plane transverse and parallel to the plane of machine tool member movement. The light beam is parallel to the axial plane of adjustment of the tool spindle 15 and is transverse to the plane of movement of the spindle head 19 when both of these members are in perfect alignment. Misalignment of the spindle head 19 on the upright 21 will be reflected directly in a deviation of the light beam as projected from the projector 30.

As shown in Figs. 1, 2 and 3, the light beam (indicated by dash line 51) from the projector 30 is directed to a deflector prism or surface 50 rigidly mounted in a frame 52 fixedly attached to the side of the spindle head 20 mounted for manual or power movement on the upright 22. The light beam is directed through a tubular shield 53, fixedly mounted in the frame 52, the shield 53 serves to prevent stray light rays from reaching the prism 50 which might possibly affect the accuracy of the parallelogrammatic light beam pattern. The prism 50 is of the reflective type whereby a light beam striking any portion of the surface is deflected downwardly toward a second tubular shield 54.

After the light beam is reflected from the prism 50, it is directed vertically downwardly onto a second prism or surface 57 rigidly mounted in a frame 58 bolted to the bottom edge of the movable column or upright 22. The path of the light beam when both of the spindle heads 19 and 20 are in approximate alignment on their respective columns, is indicated by a dotted line 59 shown in Figs. 1, 2 and 3. At this point, any deviation in the alignment of the respective spindle heads on the columns, or in the relative alignment between the spindle heads, will be reflected in the movement of the light beam from the prescribed center point on the angular surface of the prism 57. Since the frame 58 is bracketed on the side of the upright 22, the deflector prisms 50 and 57 will remain in constant vertical alignment regardless of the position of the upright 22 on the bed extension 24. The extreme outermost position of the second prism assembly 57 when the upright 22 has been moved to the most rightwardly position on the bed extension 24, as viewed in Fig. 1, is indicated by dotted lines 60.

The prism 57 is also a reflective type prism which serves to deflect a light beam. Since the light beam 59 strikes the prism from a vertical plane, the light beam will be deflected to a substantially horizontal plane outwardly through a tubular shield 61 along the side of the bed extension 24, as indicated by a dotted line 62 in Figs. 1, 2 and 3. A cast opening (not shown) in the bed or base 10 permits the light beam 62 to pass through and strike a third reflective prism or surface 65 fixedly contained in a frame 66 mounted on the lower side of the bed extension 23. In the milling and boring machine shown in Fig. 1, the prism is attached directly to the side of the bed extension 23 because the upright or column 21 is fixedly mounted thereon with no provision being made for transverse movement therebetween. While a milling and boring machine is usually constructed with both uprights stationary or both uprights slidably movable on the bed extensions, the machine illustrated and described herein is provided with one of each to better illustrate the application of the alignment mechanism to both types of machines.

A pair of tubular shields 67 and 68 attached to the frame 66 reduce the amount of chips and other debris which might otherwise collect on the prism surface. The prism 65 serves to deflect the light beam 62 from a horizontal plane to a vertical plane, as indicated by the dotted line 69. Under all conditions of alignment or misalignment of the spindle heads 19 and 22, the vertically projected light beams 59 and 69 will be parallel to each other. The vertically projected light beam 69 is disposed to strike a fourth prism or reflective surface 73 fixedly mounted in a frame 74 bolted to the side of the spindle head 19 directly above the projector 30, as shown in Fig. 1. A pair of tubular shields 75 and 76 serve to protect the prism 73 from flying chips and other debris and from stray light rays. The prism 73 deflects the light beam 69 from a vertical plane to a horizontal plane, as indicated by the dotted line 77.

The light beam 77 is directed toward an electronically sensitive target means 80. When the two spindle heads 19 and 20 are in approximate alignment, the light beam 77 will strike the target means and electronically actuate it to indicate the precise degree of misalignment. It should be noted from Fig. 1 that the light beam path created between the projector 30 and the target 80 has a parallelogrammatic form. When both spindle heads 19 and 20 are in precise alignment, the light beam thus formed will be disposed to strike the center of each of the four prisms, 50, 57, 65 and 73 before it is directed toward the target 80.

The target 80 is essentially an electronic means instantaneously actuated by a light beam to accurately indicate precise relative alignment or misalignment between one or more movable elements. The light beam is directed into the target 80 via a horizontally disposed tubular casing 81 securely mounted in a frame member 82. The frame 82 is adjustably mounted on a base member 83 bolted to the upper side of the spindle head 20, as shown in Figs. 1, 2 and 3. The frame 82 has secured thereto, a pair of supporting studs 84 and 85, as shown in Fig. 5. A portion of the studs is undercut to provide an annular supporting edge 86 which rests on the top face of the base member 83. The studs extend through holes in the member 83 and are each provided with a spring 87. The springs are disposed to engage the bottom face of the base 83 and rest on washers 88 securely retained on collars 89 pinned to the lower edge of the studs. Thus, the springs 87 serve to normally retain the edge 86 in contact with the base member 83. An adjusting post 90 engages the bottom face of the frame 82 and is threadably retained in the extending flange of the base member 83. A knurled lock nut 91 threadably retained on the post 90 below the flange of the member 83, provides means for locking the post 90 in any adjusted position. In order to effect precise alignment of the target instrument 80, the operator need only loosen the locking nut and rotate the adjusting post 90 in order to selectively raise or lower the instrument and bring the instrument into exact parallelism with the spindle 16 rotatably contained in the spindle head 20. Once this condition has been obtained, the setting of the post 90 need not be changed.

The light beam entering the tubular casing 81 is directed through a horizontally disposed aperture 92 in a wall member 93. If the light beam strikes any portion of the wall member 93, it is blocked off and, consequently, does not register on the target instrument 80. Since the light beam has retained its ribbon-like, parallel-ray characteristics, it will pass through the horizontally disposed aperture 92. While the elements are in substantial alignment on their respective uprights and with each other.

When both of the tool spindles 19 and 20 are in absolute precision alignment, the projected light beam will pass through the aperture 92 and strike an apex 94 of a prism 95 fixedly mounted on a carrier block 96 within the frame 82. When the light beam strikes the prismatic apex, it is deflected at right angles in two directions, as shown in Fig. 5. That portion of the beam deflected upwardly will strike a light sensitive cathode 101 in a phototube 102. That portion of the light beam which is deflected downwardly is disposed to strike a light sensitive cathode 103 of a phototube 104. With the light beam thus divided to provide an equal amount of light to the cathodes 101 and 103, an equal electronic current flow from each of the tubes will result. Since the tubes are connected in an electronic circuit (not shown), a balanced voltage condition will result whereby a calibrated meter 105 connected thereto will indicate to the operator that the spindle heads 19 and 20 are in alignment. An electrically actuated pointer 106 is readily readable against indicia 107 to give a direct precision reading in thousandths of an inch as to the relative degree of misalignment between the spindle heads 19 and 20. When the tool elements are in alignment, the meter 105 will give a zero reading and a pilot light 109 will be energized to indicate a condition of precise alignment.

If the light beam is shifted slightly to either side of the prismatic apex 94, an unbalanced condition will result with a greater portion of the light being reflected to one or the other of the phototubes 102 and 104. This will result in an unbalanced condition in the flow of electrons in the phototubes with a resultant indication of such a variance being shown on the meter 105. When a greater portion of the light beam is directed to the cathode 101 in the phototube 102, an unbalanced voltage condition will be created in the electronic circuit which will cause the needle 106 to be deflected rightwardly and indicate the exact amount of misalignment. At the same time, a pilot light 109 connected in the circuit will be energized to clearly indicate that a misaligned condition exists in the positioning of the spindle heads 19 and 20. Likewise, when a greater portion of the light beam is caused to be channeled by the prism 95 toward the cathode 103 of the phototube 104, the meter 105 will be electrically energized to actuate the pointer 106 leftwardly of the zero mark and indicate the precise degree of misalignment. At the same time, the pilot light 109 will be energized to indicate a misaligned condition of the spindle heads 19 and 20. The pilot lights 108 and 109 afford a visual means to the operator for discerning a condition of alignment or misalignment even though he may not be in a position to read the meter 105.

A condition wherein the spindles are not in axial alignment is clearly depicted in Fig. 2. In this case, the spindle head 19 is slightly lower than the spindle head 20, as indicated by the distance Z in Fig. 2. Since all of the instruments including the four prisms are accurately aligned to provide true parallelism with the spindles 15 and 16, the light beam 51 from the projector 30 mounted on the spindle head 19 will be directed onto the prism 50 slightly beneath center when this condition exists. Likewise, the prisms 57, 65 and 73 will serve in the same capacity and deflect the light beam. From the prism 73, the light beam is projected toward the target 80. However, since the spindle head 19 is lower than the spindle head 20, the error therebetween will again become a factor in the reflection of the beam and, in the instance shown, will not strike the target. Thus, the error is multiplied by two in each case where the spindle heads are relatively misaligned. In order to correct the misalignment, the operator need only determine the amount of misalignment between the spindle heads by reading the meter 105 and, thereafter, make a vertical adjustment of one or the other of the spindle heads. If a condition existed as depicted in Fig. 2, a choice of raising the spindle head 19 or lowering the spindle head 20 would be available. After the adjustment was made, one could readily ascertain whether the two spindles were in absolute alignment by rereading the target meter 105. The multiplication of the degree of misalignment by two in the parallelogrammatic light beam pattern serves to provide a more precise means of detecting a condition of misalignment between the spindle heads 19 and 20. With the alignment device disclosed herein, it is possible to precisely align the spindle heads regardless of their positions on their respective columns. Thus, if an exceptionally large workpiece is mounted on the work table, it is possible to bring the spindles 15 and 16 into absolute alignment without removing the workpiece.

A second type of misalignment is indicated in Figs. 3 and 6, wherein one of the spindle heads is tilted out of alignment on the column by reason of looseness of a gib, excessive wear on the way surface, or for some other reason. In this instance, the spindle head 19 is depicted as being out of alignment on the ways of the column 21 by an amount indicated by the angle X in Figs. 3 and 6. When this condition exists, a light beam 51' from the projector 30 will be projected at a corresponding angle toward the reflector 50. As the light beam is redirected by each of the four reflectors, the angle of reflection will alternately be acute, and then obtuse, or viceversa. This is clearly exemplified by the reflection of the light beam from each of the prisms 50, 57, 65 and 73, as indicated by dash lines 59', 62', 69' and 77'. For example, after the light beam is deflected by the surface 57, it will be projected at an angle X'. However, the initial deflection of the light beam by the reflector 50 will serve to continue the error in the light beam path as caused by the misalignment of the spindle head 19. As will be readily seen from the diagrammatic showing of the path of beam travel in Fig. 6, the reflected parallelogrammatic light beam pattern will be out of square with the rectangular pattern created when the two spindle heads are in perfect alignment. When a condition of misalignment exists wherein one or both of the spindle heads are out of alignment more than a few thousandths of an inch, the light beam will be interrupted because it can no longer strike all of the prisms and be received by the electronic target 80. Thus, it will be necessary to realign the particular spindle head on the upright before a reading can be obtained.

Since the reflective surface 73 is tilted at an angle corresponding to that of the projector 30 upon the occurrence of any misalignment of the spindle head 19, the light beam 69' deflected from the surface 65 will be deflected again toward the target means 80 by the reflector 73, as indicated by the dash line 77' in Fig. 6. It is well to note that the vertical light beams 59' and 69' are parallel regardless of the condition of misalignment. However, the quadrupular deflection of the light beam serves to continue the variation of the beam in the same manner as if the beam had been projected in a straight line for a distance equal to that of the parallelogrammatic light beam path. Thus, the degree of sensitivity is very high. Any slight angular deflection serves to cause a deviation in the light beam pattern, with the wall member 93 contained in the target means 80 serving to block out the light beam if such an angular deflection exceeds a predetermined amount. The angularly deflected light beam which does enter the target means 80 will strike the apex 94 of the prism 95 in a manner to prevent the obtainment of a zero reading on the calibrated meter 105. A check for angular displacement can be made by obtaining a maximum reading on each side of the zero mark. If the maximum readings obtained are not equal, an angular misalignment of one, or both, of the spindle heads 19 and 20 exists and a correction in the alignment thereof must be made.

A modification in the use of reflective prisms is shown in Fig. 7, wherein a combination of two reflective surfaces 50 and 73 and two constant-angle reflective prisms 113 and 114 is utilized to create the aforedescribed parallelogrammatic light beam pattern. When the two spindle heads are in alignment, the light beam projected from the projector 30 mounted on the spindle head 19 is directed toward the reflective surface 50 rigidly mounted on the spindle head 20. This light beam is indicated by the numeral 51 in Fig. 7. Upon striking the reflective surface 50, the beam is deflected angularly toward the fixed angle prism 113, as indicated by the line 115. After the light beam is deflected within the prism in the manner shown, it is reflected therefrom in a substantially horizontal plane toward the prism 114, as indicated by the line 116. Both of the constant angle prisms 113 and 114 are fixedly mounted on the frame of the machine and, consequently, will not be affected by the misalignment of any of the members thereon. After the light beam 116 is reflected within the prism 114, it is reflected therefrom at a right angle, as indicated by the line 117, toward the reflective surface 73 mounted on the movable spindle head 19, and from the latter surface toward the target means 80, as indicated by the line 118. The aforedescribed light beam pattern is rectangular in shape and will remain so as long as the two spindle heads are in perfect alignment.

If it is assumed that the spindle head 19 is angularly displaced, as indicated by the angle X, a light beam 51' will be emitted by the projector 30 and strike the reflective surface 50 slightly below the center point. Since the surface 50 is reflective only, a light beam 115' will be deflected at an obtuse angle and strike the constant angle prism 113 whereat it is again deflected at a fixed right angle. A light beam 116', upon leaving the prism 113, is directed toward the prism 114. It should be noted that the light beams 51' and 116' are not parallel when two constant angle prisms are used in the alignment system. From the prism 114, the light beam, as indicated by the line 117', is directed upwardly until it strikes the reflective surface 73 fixedly mounted on the spindle head 19. It is well to note that with this arrangement, the vertically projected light beams 115' and 117' are always parallel. Since we assumed that the spindle head 19 was angularly displaced in the particular instance, the reflective surface 73 will be likewise displaced angularly, as indicated by the angle X, and serve to multiply the deflection of any light beam striking it. Thus, the light beam will be further deflected, as indicated by the line 118' and, consequently, a comparatively small angular deflection will be multiplied to the extent that the finally emitted light beam will miss the wall member aperture 92 in the target means 80. Thus, the sensitivity of the alignment system herein disclosed is increased through the use of the two constant angle prisms 113 and 114.

If, for purposes of illustration, a misaligned condition is assumed wherein the spindle head 19 is in proper angular alignment on the upright 21, but that the spindle head 20 is not in angular alignment on the upright 22, a condition as depicted in Fig. 7 is obtained wherein the reflective surface 50 is canted at an angle corresponding to the degree of angular displacement of the head 20 and indicated therein by the angle Y. When such a condition exists, the light beam 51 from the projector 30 will strike the surface 50 approximately at the midpoint and will be deflected therefrom at an angle corresponding to that of the angular displacement of the spindle head. This condition is indicated by the line 115''. When this condition exists, the light beam 115'' striking the constant angle prism 113 at an angle will be projected therefrom at a constant right angle, as depicted by the line 116' toward the constant angle prism 114. This prism will again serve to project the light beam upwardly at a right angle, as indicated by the line 117''. Upon striking the reflective surface 73 on the angularly aligned spindle head 19, the light beam will be deflected for the fourth time toward the target means 80. This light beam is depicted by the line 118''. It is well to note that the vertical light beams 115'' and 117'' in the parallelogrammatic light beam path are parallel, whereas the light beams in the horizontal plane are not parallel. The angle of the light beam 118'', as finally projected toward the target means 80, has been greatly increased to render the alignment system extremely sensitive. Thus, the angle of deflection is amplified throughout the distance of the light beam path to an extent whereby minute fractions of a degree of angular displacement can be readily ascertained by reading the calibrated scale or meter 105 electronically actuated by the reception of the light beam in the target means 80.

It should be apparent to one skilled in the art that in order to further increase the sensitivity of the disclosed alignment system, it would merely be necessary to increase the length of the light beam path through the use of two or more sets of reflectors or prisms. For example, if two sets of prisms are used, the sensitivity of the system is quadrupled.

Another modified version of the invention is disclosed in Fig. 8 wherein four constant angle prisms are used to create the parallelogrammatic light beam pattern. The first of the prisms to receive the projected parallel-ray light beam is a prism 120, which is fixedly mounted on the side of the vertically movable spindle head 20. The light beam 51 from the projector 30 is deflected downwardly at a constant right angle by the prism 120 toward a prism 121 rigidly mounted on the bottom of the upright 22, as shown in Fig. 1. A vertically disposed light beam is indicated by a line 122 while the deflected light beam from the prism 121 is indicated by the line 123. The light beam 123 is projected horizontally through an opening in the bed 10 toward a prism 124 rigidly mounted on the bed extension 23. The prism 124 is likewise of the constant angle type and serves to deflect the light beam upwardly toward a prism 125 as depicted by the line 126. The constant angle prism 125, in turn, serves to deflect the light beam at a constant right angle toward the target means 80 mounted on the spindle head 20. Since the prisms 120 and 125 are rigidly mounted on the spindle heads 20 and 19, respectively, any lateral or angular misalignment of the spindle heads will be reflected immediately in the position of their respective prisms. The light beam from the prism 125 is depicted by a line 127 and is disposed for reception by the target means 80 as aforedescribed. The light beam path, as hereto described, forms a perfect rectangle, since the two spindle heads 19 and 20 are shown in perfect alignment.

A condition wherein one of the prisms mounted on the spindle heads is canted, due to a misalignment of the spindle head, is indicated by the line showing of the prism 125. In this case, the parallelogrammatic light beam pattern, as indicated by the dotted lines 51', 122', 123', 126' and 127' is canted at an angle corresponding to that of the angle of misalignment of the spindle head 19, although all sides of the light beam pattern are still parallel. The actual degree of misalignment, whether laterally or angularly, may be readily ascertained by reading the meter 165 on the target 80 in the manner previously described.

The application of the aligning apparatus to a machine tool, as herein described, will enable an operator to quickly align the machine tool elements without the use of a plurality of precision instruments such as has heretofore been the practice. The alignment apparatus disclosed may be readily installed on any existing machine tool at a minimum of cost and with the assurance that the machine elements can be readily checked for alignment both with respect to angularity on the uprights and with respect to alignment with each other. Other than the replacement of the electronic tubes in the target means 80, the cost of maintenance of this apparatus is negligible.

Although the alignment apparatus has been disclosed as applied to a dual spindle milling and boring machine, it is to be understood that the apparatus may be adapted to any one of the many types of machine tools with equal versatility. The apparatus can be adapted to check the alignment of machine tools having a single movable element. When applied to such a machine, the projector, or the target means, would be mounted on a stationary portion of the machine tool, while the prisms or reflective surfaces would be mounted on the movable element. It is also to be understood that the apparatus could be designed to provide other than a parallelogrammatic light beam pattern.

Although the illustrative embodiment of the invention has been described in detail in order to fully disclose the manner in which the invention may be practiced, it is to be understood that the particular apparatus set forth is intended to be illustrative only and that the various novel features of the invention may be incorporated in other structural forms without departing from the spirit and scope of the invention as defined in the subjoined claims.

The principles of the invention having now been fully explained in connection with the foregoing description of illustrative embodying apparatus, the invention is hereby claimed as follows:

1. An electrooptical alignment device for indicating the relative misalignment between relatively movable members of a machine tool comprising a light beam projecting means mounted on one of said members and disposed to project a uniform light beam in the direction of said other movable member, a plurality of fixed light reflecting prisms predeterminately positioned on said machine tool in operative spaced relation to each other and to said projecting means to reflect the light beam in paths forming a parallelogrammatic pattern, a light beam receiving target member disposed on the other of said movable members to receive the light beam reflected from the last of said prisms when said members are in approximate alignment, and an alignment indicating means operatively attached to said light beam receiving target member and rendered electrically operative to indicate relative positions of each of said movable members and any misalignment between said members, whereby misalignment is readily indicated and said members may be brought into precise alignment by adjusting said machine tool according to the readings of said alignment indicating means.

2. An apparatus for aligning movable machine tool members comprising a light beam sender means fixedly carried on one of said tool members and disposed to project a uniform beam of light, an electronically sensitive light beam target means fixedly carried on the other of said members to receive the light beam with said sender means and said target means parallelly displaced a predetermined distance whenever said members have been moved into precise alignment, a plurality of reflective prisms fixedly mounted on said movable tool members and on immovable portions of said machine tool in operative spaced relation to each other to reflect a light beam originating from said sender means in paths forming a parallelogrammatic pattern for reception by said target means, and a metered alignment indicator operatively connected to said light beam target means whereby variations in said light beam parallelogrammatic pattern occurring upon misalignment of said movable members is measurable by said alignment indicator.

3. In an aligning apparatus for movable members, a light beam projector fixedly mounted on one of said movable members and disposed to project a uniform beam of light toward the other movable members, a light beam prism reflecting means fixedly mounted on the other movable member to receive and deflect the light beam from said projector, a pair of fixed light beam reflecting means rigidly mounted upon the base member against movement adjacent said movable members and disposed in operative spaced relation to successively receive and deflect the light beam from said first named reflecting means, a light beam prism reflecting means fixedly mounted on the projector supporting member and disposed to receive and deflect the light beam from one of said pair of rigidly mounted light beam reflecting means, a light beam receiving means disposed on the other movable member to receive the light beam from said last named movable light beam prism reflecting means, and indicating apparatus operatively connected to said receiving means to signal the reception of a light beam of predetermined intensity whereby the alignment of said movable members may be checked by observing the operation of said indicating means.

4. In a milling machine, a bed, a work retaining member slidably mounted on said bed, an upright column mounted on each side of said bed, a tool retaining spindle head slidably mounted for vertical movement on each of said columns, means to effect selective movement of each of said spindle heads on said columns, a light beam projecting means mounted on one of said spindle heads and disposed to project a uniform light beam in the direction of the other slidable spindle head, a plurality of fixedly and movably mounted light beam-directing and reflecting means on said milling machine bed and said spindle heads respectively in an operative spaced relationship to each other to direct the light beam from said projecting means in predetermined paths forming a parallelogrammatic pattern, a light beam receiving means on the other of said spindle heads to receive the projected light beam, and a signal device operative upon the reception of the light beam from said projecting means as directed by said plurality of fixed and movable light beam directing and reflecting means through said receiving means to indicate the positive alignment of said spindle heads.

5. An alignment device for a machine tool having a base, a work retaining table slidably mounted on said base and two uprights with tool retaining spindle heads slidably mounted thereon and comprising a light beam projecting means adjustably mounted on one of the spindle heads and disposed to project a uniform light beam, a plurality of light beam reflecting and deflecting means fixedly mounted on each of said spindle heads and said base in operative spaced relation to each other and to said projecting means and disposed to sequentially receive and deflect said light beam in a parallelogrammic shaped pattern, a light beam receiving means mounted on the other of the spindle heads to receive said light beam at a predetermined point in the pattern, and an alignment indicator operatively connected to said light beam receiving means and operative upon the reception of the light beam to indicate alignment or misalignment between the spindle heads on said uprights.

6. In an alignment measuring device for machine tools, the combination of selectively movable machine tool elements mounted on a base, a light beam projecting means operatively mounted on one of said elements and disposed to project a uniform light beam therefrom, optical misalignment multiplying prisms fixedly mounted in operative spaced relation on said movable elements and on said base in a manner to deflect and reflect the light beam from said projecting means in paths forming a parallelogrammatic pattern and to distort the light beam upon the occurrence of any misalignment between said movable elements and said base, a photoelectric light beam receiver mounted on another of said movable elements and electronically operative to receive the light beam, and an alignment indicating mechanism electrically connected to said photoelectric light beam receiver whereby the occurrence of misalignment between the machine tool elements or between the movable elements and the base will be readily indicated as the light beam distortion is multiplied upon the displacement of said prisms.

7. In an alignment indicating device for a machine tool having two relatively movable members operatively mounted on a bed, a light beam projecting means and reflecting prism means mounted on one of said movable members and disposed to project a uniform light beam in the direction of the other movable member, a light target receiving member and reflecting prism means disposed on the other movable member to receive the light beam from the projecting means, fixed reflecting prism means on the bed of said machine tool in operatively spaced relation relative to each other and to said light beam projecting means and reflecting prism means and said light beam target receiving member and reflecting prism means, with said projecting means, target means, and said fixed and movable reflecting prism means predeterminately positioned to reflect the light beam in paths forming a fixed parallelogrammatically shaped pattern from the light beam projecting means to said light beam target means, and an alignment indicating means operatively connected to said target means whereby misalignment of either of said movable members or misalignment between the two movable members on said machine tool is readily indicated thereon.

8. An electro-optical alignment apparatus for machine tools having relatively movable members comprising a light beam projecting means and reflecting prism means mounted on one of said movable members and disposed to project a uniform light beam toward said other movable member, a light beam receiving and reflecting prism means mounted on the other movable member to receive said light beam, a plurality of fixed light beam receiving and reflecting prism means mounted on said machine tool in spaced relation to each other and to said first named receiving and reflecting prism means to reflect said light beam in paths forming a predetermined parallelogrammatic pattern, a light beam target receiving member disposed on said other movable machine tool member to receive the reflected light beam, and an alignment indicating means electrically actuated by said light beam to indicate misalignment of said movable members and misalignment between said movable members on said machine tool.

9. An electro-optical alignment device for indicating the relative misalignment between relatively movable members of a machine tool and comprising a light beam projecting means and reflecting means mounted on one of said movable members and disposed to project a uniform light beam in the direction of the other movable machine tool member, a light beam target receiving member and reflecting means mounted on the other movable machine tool member with said reflecting means disposed to receive the light beam originating from said projecting means, a plurality of fixed light beam reflecting means mounted on said machine tool in operative spaced relation to each other and to said reflecting means mounted on said movable members, said light beam projecting means, and said light beam target means to provide a circuitous light beam path pattern of predetermined parallelogrammatic shape from said projecting means to said target means and disposed to be varied upon the occurrence of any misalignment of either of said movable machine tool members, and an electronic alignment indicating means on said target receiving member operatively actuated by the light beam whereby the degree of misalignment of said movable machine tool members may be readily determined.

10. An electro-optical alignment device for a machine tool having relatively movable members operatively mounted thereon, and comprising a light beam projecting means mounted on one of said movable members and disposed to project a uniform light beam therefrom, a plurality of fixed reflecting prism means mounted on said movable machine tool members and on stationary portions of said machine tool in operative spaced relation to each other and to said light beam projecting means, a light beam target member mounted on said other movable member to receive the light beam, said projecting means, said reflecting prism means, and said target means being predeterminately positioned to reflect the light beam in a path forming a parallelogrammatically shaped pattern whereby misalignment of either of said movable members serves to distort said pattern, and an alignment indicating means operatively connected to said target means to indicate the degree of misalignment which may occur in either of said movable machine tool members.

11. In an optical alignment device for machine tools having relatively movable members slidably disposed on a base, a light beam projecting means mounted on one of said members in a manner to project a uniform light beam therefrom, a rigidly mounted reflecting means on said other movable member to receive the light beam from said projecting means, a pair of stationary reflecting means on said machine tool base to successively receive said light beam and reflect the same in a predetermined path, a second rigidly mounted reflecting means on said first mentioned movable member to receive said light beam from said stationary reflecting means, and a light beam target means mounted on said other movable member in a manner to receive said light beam from said second reflecting means, with said projecting means, said reflecting means and said target means positioned on said machine tool to transmit said light beam in paths forming a parallelogrammatically shaped pattern and with said pair of stationary reflecting means serving to distort said light beam pattern upon the occurrence of any misalignment of said movable machine tool members and vary the effect of said light beam on said target means to indicate such misalignment.

References Cited in the file of this patent

UNITED STATES PATENTS

| Number | Name | Date |
|---|---|---|
| 2,079,791 | Cook | May 11, 1937 |
| 2,136,223 | Thomas | Nov. 8, 1938 |
| 2,400,840 | Peters | May 21, 1946 |
| 2,402,856 | Turrettini | June 25, 1946 |
| 2,412,017 | Taylor et al. | Dec. 3, 1946 |
| 2,425,750 | McCarty | Aug. 19, 1947 |

FOREIGN PATENTS

| Number | Country | Date |
|---|---|---|
| 218,457 | Great Britain | July 10, 1924 |
| 240,426 | Great Britain | Nov. 19, 1925 |
| 539,858 | Germany | Dec. 3, 1931 |
| 761,580 | France | Jan. 10, 1934 |